(12) United States Patent
Ueda et al.

(10) Patent No.: US 6,417,306 B1
(45) Date of Patent: Jul. 9, 2002

(54) TRANSPARENT HEAT-RESISTANT RESIN AND PRODUCTION PROCESS THEREFOR

(75) Inventors: Kenichi Ueda, Suita; Tomomi Makino, Ashiya; Minoru Yamaguchi, Ibaraki, all of (JP)

(73) Assignee: Nippon Shokubai Co., Ltd,, Osaka (JP)

(*) Notice: Subject to any disclaimer, the term of this patent is extended or adjusted under 35 U.S.C. 154(b) by 85 days.

(21) Appl. No.: 09/722,344

(22) Filed: Nov. 28, 2000

(30) Foreign Application Priority Data

Dec. 13, 1999 (JP) ............................. 11-353622

(51) Int. Cl.$^7$ ................................. C08F 26/08
(52) U.S. Cl. ................. 526/264; 526/193; 526/259; 526/320; 526/328.5
(58) Field of Search ................ 526/193, 259, 526/264, 320, 328.5

(56) References Cited

U.S. PATENT DOCUMENTS 5,998,556 A   12/1999   Kanto et al. ............... 526/262

FOREIGN PATENT DOCUMENTS

| GB | 1176681 | 1/1970 |
|----|---------|--------|
| JP | 141715  | 6/1986 |
| JP | 171708  | 8/1986 |
| JP | 175711  | 7/1990 |
| JP | 116331  | 4/1994 |
| JP | 324016  | 12/1997 |
| JP | 45850   | 2/1998 |
| JP | 45852   | 2/1998 |
| WO | WO9303076 | 2/1993 |

*Primary Examiner*—Helen L. Pezzuto
(74) *Attorney, Agent, or Firm*—Roylance, Abrams, Berdo & Goodman, L.L.P.

(57) ABSTRACT

The present invention provides: a transparent heat-resistant resin that has a small amount of both the residual maleimide monomer and the maleimide monomer generated by heating in order to carry out such as a mold processing, and further, is excellent in heat resistance and yellowish little; a production process therefor; and a resin composition utilizing this resin. The transparent heat-resistant resin, according to the present invention, is obtained by a process including the step of running a polymerization of comonomers including a maleimide monomer and a methacrylic acid ester monomer, wherein the amount of the residual maleimide monomer in the resin is not more than 10× ppm when the amount of a structural unit derived from the maleimide monomer is X weight % in the resin, and the amount of the generated maleimide monomer by heating the resin at 240° C. for 10 minutes is not more than 10× ppm when the amount of a structural unit derived from the maleimide monomer is X weight % in the resin. In addition, the production process for a transparent heat-resistant resin, according to the present invention, comprises the step of running a polymerization of comonomers including a maleimide monomer and a methacrylic acid ester monomer in order to obtain a transparent resin having heat resistance, wherein an acidic substance is made to exist with a sulfur chain-transfer agent in the polymerization system during the polymerization.

16 Claims, No Drawings

TRANSPARENT HEAT-RESISTANT RESIN AND PRODUCTION PROCESS THEREFOR

BACKGROUND OF THE INVENTION

A. Technical Field

The present invention relates to a production process and a use for a transparent heat-resistant resin having both transparency and heat resistance, a production process therefor, and its use, more particularly, to a production process for a transparent heat-resistant resin, which is preferably used for such as optical materials and automobile materials to need shape stability and colorless transparency in a high temperature because of being excellent in heat resistance; a production process therefor; and its use.

B. Background Art

It is known that thermoplastic resins having a good balance with various physical properties such as heat resistance, heat stability, mechanical strength, and moldability, can be produced by copolymerizing high copolymerizable maleimide monomer and other monomer such as methacrylic acid ester up to now.

Among these thermoplastic resins, a thermoplastic resin obtained by copolymerizing methacrylic acid ester monomer and maleimide monomer is excellent in transparency and heat resistance, and becomes often used for the fields to need heat resistance and transparency, such as optical materials and automobile materials. Particularly, it is generally known to introduce the maleimide monomer much more if the resin needs more higher heat resistance.

When polymerizing the methacrylic acid ester monomer, a chain-transfer agent such as mercaptan is used in order to suppress to form a terminal double bond by disproportionation termination and to adjust molecular weight. The double bond by disproportionation termination is formed in the polymer terminal and pyrolysis by zipping is easily arises unless the chain-transfer agent is used. However, if using the chain-transfer agent, a Michael adduct of such as the mercaptan and the maleimide monomer during the polymerization is formed and a reverse reaction is carried out in a heat treatment process (such as devolatilization and granulation) after the polymerization. As a result, the maleimide monomer remained much.

If the maleimide monomer remains much, the much maleimide monomer evaporates and disperses from the melting resin when heat processing the resin as obtained. In recent years, the toxicity of the maleimide monomer is considered, and the influence on human body and environment is feared. In addition, it is feared to give the similar danger to such as a worker if the maleimide monomer is generated by pyrolysis because the heat stability of the resin is not sufficient and the resin is heated in order to carry out a mold processing.

On the other hand, if polymerizing comonomers including the maleimide monomer, there was a problem that yellowness is easily caused by heating during the polymerization or the mold processing. For example, if the Michael adduct and the residual maleimide monomer thereby become much, an amine compound is generated and yellowness is caused easily by the amine compound. Particularly, it is known that arylamine has a great influence on the yellowness when using arylmaleimide that generates the arylamine.

Until now, as a method for decreasing the residual maleimide monomer, for example, JP-A-141715/1986 and JP-A-171708/1986 disclose arts of: carrying out a suspension polymerization of N-phenylmaleimide/methyl methacrylate, and washing by alcohol or carrying out styrene copolymerization in order to decreasing the residual maleimide monomer. However, the residual maleimide monomer is still much by these methods. Moreover, only a yellowish polymer has obtained.

In addition, as a method for decreasing yellowness, for example, JP-A-175711/1990 discloses an art of: suppressing hydrolysis of the maleimide monomer by controlling pH during the suspension polymerization, and decreasing the generation of the amine compound that causes yellowness. However, the effects in a reaction system including N-phenylmaleimide that causes yellowness as mentioned above conspicuously, is not reported. Moreover, the residual maleimide monomer was still much.

In addition, JP-A-324016/1997 discloses an art of: decreasing the residual maleimide monomer and yellowness also by controlling a supplying method of the monomer in the solution polymerization. The residual maleimide monomer considerably decreased thereby. However, heat stability was deteriorated and the maleimide monomer generated by heating in order to carry out such as a mold processing was much in the existing circumstances.

In this way, until now, in transparent heat-resistant resins derived from a methacrylic acid ester monomer/a maleimide monomer, it was difficult to fulfill decreasing the residual maleimide monomer and the maleimide monomer generated by heating in order to carry out such as a mold processing, and suppressing yellowness at the same time.

SUMMARY OF THE INVENTION

A. Object of the Invention

Therefore, an object of the present invention is to provide: a transparent heat-resistant resin that has a small amount of both the residual maleimide monomer and the maleimide monomer generated by heating in order to carry out such as a mold processing, and further, is excellent in heat resistance and yellowish little; a production process therefor; and a resin composition utilizing this resin.

B. Disclosure of the Invention

The present inventors diligently studied to solve the above problems. As a result, they found that Michael adducts formed as by-products during the polymerization are decreased and hydrolysis of a maleimide monomer can be suppressed at the same time by making an acidic substance exist in the polymerization system for polymerizing a methacrylic acid ester monomer/a maleimide monomer by use of a chain-transfer agent such as mercaptan. Thereby, they also found that: even in case of introducing N-substituted maleimide that can give high heat resistance only, the residual maleimide monomer and the maleimide monomer generated by heating in order to carry out such as a mold processing are decreased and the yellowness can be suppressed. Then, the present invention was completed.

That is to say, a transparent heat-resistant resin, according to the present invention, is obtained by a process including the step of running a polymerization of comonomers including a maleimide monomer and a methacrylic acid ester monomer, wherein: the amount of the residual maleimide monomer in the resin is not more than 10×ppm when the amount of a structural unit derived from the maleimide monomer is X weight % in the resin, and the amount of the generated maleimide monomer by heating the resin at 240° C. for 10 minutes is not more than 10×ppm when the amount of a structural unit derived from the maleimide monomer is X weight % in the resin.

In addition, a production process for a transparent heat-resistant resin, according to the present invention, comprises the step of running a polymerization of comonomers including a maleimide monomer and a methacrylic acid ester monomer in order to obtain a transparent resin having heat resistance, with the production process being characterized by making an acidic substance exist with a sulfur chain-transfer agent in the polymerization system during the polymerization.

In addition, a resin composition, according to the present invention, comprises the transparent heat-resistant resin according to the present invention, and a synthetic resin except for the transparent heat-resistant resin.

These and other objects and the advantages of the present invention will be more fully apparent from the following detailed disclosure.

DETAILED DESCRIPTION OF THE INVENTION

<Production Process for the Transparent Heat-resistant Resin>

(Comonomers)

The production process for a transparent heat-resistant resin, according to the present invention, comprises the step of running a polymerization of comonomers including a maleimide monomer and a methacrylic acid ester monomer. The heat stability of the resin as obtained can be improved because the comonomers include the maleimide monomer, and transparency can be given to the resin as obtained because the comonomers include the methacrylic acid ester monomer.

The maleimide monomer as included in the comonomers is not especially limited, examples thereof include N-substituted maleimide as described in formula (1) below preferably.

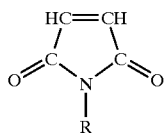
(1)

(where: R represents hydrogen, an alkyl group having 1 to 15 carbon atoms, a cycloalkyl group, a substituted alkyl group, an aryl group, or a substituted aryl group.) Examples of such N-substituted maleimide include N-cyclohexylmaleimide, N-phenylmaleimide, N-methylmaleimide, N-ethylmaleimide, N-isopropylmaleimide, N-t-butylmaleimide, N-laurylmaleimide, N-benzylmaleimide, and N-tribromophenylmaleimide. Among these, particularly, N-cyclohexylmaleimide and N-phenylmaleimide are preferable in view of the transparency, the low-yellowness and the heat resistance of the resin as obtained or the molded product thereof. Furthermore, N-phenylmaleimide is more preferable in view of improving capacity for heat residence and reactivity. In addition, in case of using N-tribromophenylmaleimide, fireproof can be given to the resin as obtained or the molded product thereof. Incidentally, these can be used either alone respectively or in combinations with each other.

The content of the maleimide monomer as included in the comonomers is preferably in the range of 3 to 50 weight %, more preferably 5 to 40 weight %. In case where the content is more than 50 weight %, the yellowness of the resin as obtained becomes deep and the mechanical strength of the resin tends to deteriorate. In case where the content is less than 3 weight %, there is the possibility that sufficient heat resistance cannot be given to the resin.

The methacrylic acid ester monomer as included in the comonomers is not especially limited, examples thereof preferably include methacrylic acid esters having at least one member selected from the group consisting of an alkyl group that has or does not have a substituent, and has 1 to 18 carbon atoms, cyclohexyl group and benzyl group. Examples of such methacrylic acid ester monomer include methyl methacrylate, ethyl methacrylate, propyl methacrylate, isopropyl methacrylate, butyl methacrylate, isobutyl methacrylate, t-butyl methacrylate, amyl methacrylate, isoamyl methacrylate, octyl methacrylate, 2-ethylhexyl methacrylate, decyl methacrylate, lauryl methacrylate, cyclohexyl methacrylate, benzyl methacrylate, 2-phenoxyethyl methacrylate, 3-phenylpropyl methacrylate, and 2-hydroxyethyl methacrylate. These can be used either alone respectively or in combinations with each other.

The content of the methacrylic acid ester monomer as included in the comonomers is preferably not more than 97 weight %, more preferably in the range of 50 to 97 weight %, most preferably 60 to 95 weight %. In case where the content is more than 97 weight %, there is the possibility that the heat stability or the heat resistance of the resin as obtained deteriorates. In case where the content is less than 50 weight %, there is the possibility that the transparency or the weather resistance of the resin deteriorates.

As the comonomers, other monomers except for the maleimide monomer and the methacrylic acid ester monomer can be included if necessary. Examples of the other monomers as such include: aromatic vinyl monomers; unsaturated nitrile monomers; acrylic acid ester monomers; olefin monomers; diene monomers; vinyl ether monomers; vinyl ester monomers; fluorovinyl monomers; (meth)allyl ester monomers derived from saturated fatty monocarboxylic acid: multi-functionalized (meth)acrylate monomers; multi-functionalized allyl ester monomers; glycidyl compounds; and unsaturated carboxylic acid monomers. Among these, the amount of the residual maleimide monomer can be reduced effectively, and further, the heat stability can be improved by using the aromatic vinyl monomers. However, the heat resistance tends to deteriorate. Incidentally, these can be used either alone respectively or in combinations with each other.

Examples of the aromatic vinyl monomers include styrene, α-methyl styrene, p-methyl styrene, isopropenylstyrene, vinyltoluene, and chlorostyrene. Among these, styrene is most preferable.

Examples of the unsaturated nitrile monomers include acrylonitrile, methacrylonitrile, ethacrylronitrile, and phenylacrylronitrile.

Examples of the acrylic acid ester monomers include methyl acrylate, ethyl acrylate, propyl acrylate, isopropyl acrylate, butyl acrylate, isobutyl acrylate, t-butyl acrylate, amyl acrylate, isoamyl acrylate, octyl acrylate, 2-ethylhexyl acrylate, decyl acrylate, lauryl acrylate, cyclohexyl acrylate, benzyl acrylate, 2-hydroxyethyl acrylate, and isobornyl acrylate.

Examples of the olefin monomers include ethylene, propylene, isobutylene, and diisobutylene.

Examples of the diene monomers include butadiene and isoprene.

Examples of the vinyl ether monomers include methyl vinyl ether and butyl vinyl ether.

Examples of the vinyl ester monomers include vinyl acetate and vinyl propionate.

Examples of the fluorovinyl monomers include vinylidene fluoride.

Examples of the (meth)allyl ester monomers derived from saturated fatty monocarboxylic acid include allyl propionate.

Examples of the multi-functionalized (meth)acrylate monomers include ethylene glycol di(meth)acrylate, diethylene glycol (meth)acrylate, divinylbenzene, diallyl phthalate, trimethylolpropane tri(meth)acrylate, hexanediol di(meth)acrylate, pentaerythritol tetra(meth)acrylate, di pentaerythritol tetra(meth)acrylate, di(meth)acrylates of ethylene oxide or propylene oxide adduct of Bisphenol A; di(meth)acrylates of ethylene oxide or propylene oxide adduct of halogenated Bisphenol A; and di or tri(meth)acrylates of ethylene oxide or propylene oxide adduct of isocyanurates.

Examples of the multi-functionalized allyl ester monomers include triallyl isocyanurate.

Examples of the glycidyl compounds include glycidyl (meth)acrylate, allylglycidyl (meth)acrylate, and allyl glycidyl ether.

Examples of the unsaturated carboxylic acid monomers include acrylic acid, methacrylic acid, itaconic acid, maleic acid, fumaric acid, and their half esters or acid anhydrides.

If the above-mentioned other monomer except for the maleimide monomer and the methacrylic acid ester monomer is jointly used, the content of the other monomer is preferably not more than 20 weight % of the comonomers. Particularly, if the aromatic vinyl monomer is used, the content of the aromatic vinyl monomer is preferably not more than 15 weight % of the comonomers, more preferably not more than 10 weight %. In case where the content is more than the above range, there is the possibility that the molding processibility, the hot-water resistance, the transparency, or the weather resistance of the resin as obtained or the molded product thereof deteriorates.

(Sulfur Chain-transfer Agent)

The production process, according to the present invention, comprises making the sulfur chain-transfer agent exist in the polymerization system when polymerizing comonomers including the maleimide monomer and the methacrylic acid ester monomer. The heat resistance of the resin as obtained can be improved by making the sulfur chain-transfer agent exist.

The sulfur chain-transfer agent is not especially limited, but examples thereof include mercaptan chain-transfer agents such as n-butyl mercaptan, t-butyl mercaptan, n-decyl mercaptan, t-decyl mercaptan, n-dodecyl mercaptan, t-dodecyl mercaptan, hydroxyethyl mercaptan, and thioglycolic acid. The mercaptan chain-transfer agents are particular preferable because the agents are excellent in improving capacity for heat stability and are easily available. These sulfur chain-transfer agents can be used either alone respectively or in combinations with each other.

The amount of the sulfur chain-transfer agent as used is preferably in the range of 0.001 to 1.0 weight % of the comonomers. In case where the amount is more than 1.0 weight %, the molecular weight of the resin as obtained tends to lower too much. In case where the amount is less than 0.001 weight %, the disproportionation termination caused by chain transfer is suppressed insufficiently. Incidentally, the sulfur chain-transfer agent can be added before starting the polymerization, for example, added at the same time of charging the comonomers, or can be added successively or batchwise into the reaction system during the polymerization.

(Acidic Substance)

The production process, according to the present invention, comprises making the acidic substance exist with the sulfur chain-transfer agent in the polymerization system when polymerizing comonomers including the maleimide monomer and the methacrylic acid ester monomer. Michael adducts formed as by-products during the polymerization are decreased and hydrolysis of the maleimide monomer can be suppressed at the same time by making the acidic substance exist. Thereby, even in case of introducing the maleimide monomer that can give high heat resistance only, the residual maleimide monomer and the generated maleimide monomer by heating in order to carry out such as a mold processing are decreased and the yellowness can be suppressed.

The acidic substance is a substance of which pH is in the range of 2.0 to 6.5, preferably 3.0 to 5.5, when the pH is measured by adding a definite amount of the acidic substance into the same amount of water by weight as the entirety of monomers and solvent in the polymerization system. The amount of the acidic substance is preferably in the range of 0.001 to 5 weight % of the comonomers.

Examples thereof include an organophosphorus compound and an organic acid preferably.

Examples of the organophosphorus compound include:
1) alkyl(aryl)phosphorous acids (which may be their tautomers, namely, alkyl(aryl)phosphinic acids) such as methylphosphonous acid, ethylphosphonous acid, and phenylphosphonous acid, and their diesters or monoesters;
2) dialkyl(aryl)phosphinic acids such as dimethylphosphinic acid, diethylphosphinic acid, diphenylphosphinic acid, phenylmethylphosphinic acid, and phenylethylphosphinic acid, and their esters;
3) alkyl(aryl)phosphonic acids such as methylphosphonic acid, ethylphosphonic acid, trifluoromethylphosphonic acid, and phenylphosphonic acid, and their diesters or monoesters;
4) alkyl(aryl)phosphinous acids such as methylphosphinous acid, ethylphosphinous acid, and phenylphosphinous acid, and their esters;

5) phosphite diesters or monoesters or triesters, such as methyl phosphite, ethyl phosphite, phenyl phosphite, dimethyl phosphite, diethyl phosphite, diphenyl phosphite, trimethyl phosphite, triethyl phosphite, and triphenyl phosphite;
6) phosphate diesters or monoesters or triesters, such as methyl phosphate, ethyl phosphate, 2-ethylhexyl phosphate, phenyl phosphate, dimethyl phosphate, diethyl phosphate, di-2-ethylhexyl phosphate, diphenyl phosphate, trimethyl phosphate, triethyl phosphate, and triphenyl phosphate;
7) mono-, di-, or trialkyl(aryl)phosphines such as methylphosphine, ethylphosphine, phenylphosphine, dimethylphosphine, diethylphosphine, diphenylphosphine, trimethylphosphine, triethylphosphine, and triphenylphosphine;
8) alkyl(aryl)halogenphosphines such as methyldichlorophosphine, ethyldichlorophosphine, phenyldichlorophosphine, dimethylchlorophosphine, diethylchlorophosphine, and diphenylchlorophosphine;
9) mono-, di-, or trialkyl(aryl)phosphine oxides such as methylphosphine oxide, ethylphosphine oxide, phenylphosphine oxide, dimethylphosphine oxide, diethylphosphine oxide, diphenylphosphine oxide, trimethylphosphine oxide, triethylphosphine oxide, and triphenylphosphine oxide; and
10) tetraalkyl(aryl)phosphonium halides such as tetramethylphosphonium chloride, tetraethylphosphonium chloride, and tetraphenylphosphonium chloride. These can be used either alone respectively or in combinations with each other.

Among the organophosphorus compounds as exemplified above, particularly, it is preferable to use at least one member selected from the group consisting of: alkyl(aryl) phosphorous acids and their diesters or monoesters; alkyl (aryl)phosphinic acids and their esters; alkyl(aryl) phosphonic acids and their diesters or monoesters; alkyl (aryl)phosphinous acids and their esters; alkyl(aryl) phosphorous acid diesters, monoesters or triesters; and alkyl (aryl)phosphoric acid diesters, monoesters or triesters (above-mentioned 1) to 6)), because the residual maleimide monomer is decreased and the yellowness is suppressed.

The amount of the organophosphorus compound as used is preferably in the range of 0.001 to 5.0 weight % of the comonomers, more preferably 0.001 to 1.0 weight %, most preferably 0.005 to 1.0 weight %. In case where the amount is more than 5.0 weight %, the yellowness of the resin as obtained becomes deep and the heat resistance of the resin tends to lower. In case where the amount is less than 0.001 weight %, the organophosphorus compound cannot display the effect of suppressing to form Michael adducts sufficiently.

Examples of the organic acid include: carboxylic acids such as acetic acid, propionic acid, butyric acid, valeric acid, caproic acids caprylic acid, capric acid, lauric acid, stearic acid, oleic acid, linoleic acid, linolenic acid, benzoic acid, cyclohexanecarboxylic acid, phthalic acid, isophthalic acid, and terephthalic acid; and their acid anhydrides such as acetic anhydride, propionic anhydride, and phthalic anhydride. Among these, the acid anhydrides are particularly preferable because they are highly effective in decreasing the yellowness of the resin as obtained. Incidentally, these organic acids may be used either alone respectively or in combinations with each other.

The amount of the organic acid as used is preferably in the range of 0.001 to 1.0 weight % of the comonomers, more preferably 0.005 to 0.5 weight %. In case where the amount is more than 1.0 weight %, the yellowness of the resin as obtained becomes deep and the heat resistance of the resin tends to lower. In case where the amount is less than 0.001 weight %, the organic acid cannot display the effect of suppressing to form Michael adducts sufficiently.

Incidentally, the acidic substance may be added before starting the polymerization, for example, added at the same time of charging the comonomers, or may be added successively or batchwise into the reaction system during the polymerization. It is not especially limited, but it is preferable that the organophosphorus compound exists in the reaction system before starting the polymerization.

In the present invention, the effect of the present invention can be displayed sufficiently, whether the organophosphorus compound and the organic acid may be jointly used as the acidic substance or either of them may be used alone. In addition, the acidic substance may cause the yellowness by hydrolysis of the maleimide monomer because water exists in the reaction system and the water has an influence on the maleimide monomer in an acidic condition. Therefore, it is preferable that the preferred embodiments of the present invention are carried out by the polymerization reaction in a nonaqueous system.

(Polymerization Method)

The polymerization method of the comonomers is not especially limited, but for example, conventional polymerization methods such as solution polymerization, suspension polymerization, bulk polymerization, emulsion polymerization and a method in combination therewith properly, can be adopted. Among these, particularly, the solution polymerization or the bulk polymerization is preferable in consideration of displaying the effect of the present invention remarkably, and the solution polymerization is more preferable. Particularly, as mentioned above, if the acidic substance is used, it is a possibility that the acidic substance may cause the yellowness by hydrolysis of the maleimide monomer in a system of existing water such as a system of the suspension polymerization. Therefore, it is preferable to adopt the polymerization method in the nonaqueous system. Incidentally, the polymerization temperature and the polymerization time are not especially limited, but can be settled properly according to kinds of monomers as used or the content thereof. However, the polymerization is normally carried out at the polymerization temperature of about 60° C. to about 150° C. and the polymerization time is in the range of about 4 hours to about 24 hours.

The solvent as used in the solution polymerization is not especially limited, examples thereof include aromatic hydrocarbons such as toluene, xylene, and ethylbenzene; ketones such as methyl ethyl ketone and methyl isobutyl ketone; and chloroform, DMSO, and tetrahydrofuran. These can be used either alone respectively or in combinations with each other.

In the polymerization reaction, an initiator may be added, if necessary. The polymerization initiator is not especially limited, but examples thereof include: conventional polymerization initiators such as organic peroxides (for example, cumene hydroperoxide, diisopropylbenzene hydroperoxide, di-t-butyl peroxide, lauroyl peroxide, benzoyl peroxide, t-butyl peroxyisopropyl carbonate, and t-amyl peroxy-2-ethylhexanoate); and azo compounds (for example, 2,2'-azobis(isobutyronitrile), 1,1'-azobis(cyclohexanecarbonitrile), and 2,2'-azobis(2,4-dimethylvaleronitrile)). These may be used either alone respectively or in combinations with each other. Incidentally, the amount of the initiator as used may fitly be set according to factors such as combinations of monomers as used and reaction conditions, therefore, is not especially limited.

In the present invention, according to the object to use the transparent heat-resistant resin as used, various conventional additives such as antioxidants, ultraviolet absorbing agents, and colorants, can be included during or after the polymerization reaction. These additives may be included in the transparent heat-resistant resin according to the present invention by adding during the polymerization, or in the resin composition according to the present invention by adding after the polymerization reaction. The amount of the additives may be determined optionally if the effect of the present invention is not damaged. Incidentally, the additives may be used either alone respectively or in combinations with each other.

Examples of the antioxidants include a phenol antioxidant and a phosphorus antioxidant. Among these, the phenol antioxidant is preferably used. Particularly, the yellowness of the resin can be decreased more effectively by using the phenol antioxidant and the phosphorus antioxidant jointly.

A hindered phenol antioxidant of which hydroxyl group is sterically hindered to approach other molecule is particularly preferable as the phenol antioxidant. Examples of the hindered phenol antioxidant include: pentaerythrityl-tetrakis[3-(3,5-di-t-butyl-4-hydroxyphenyl)propionate]1,6-hexanediol-bis[3-(3,5-di-t-butyl-4-hydroxyphenyl) propionate], and tris-(3,5-di-t-butyl-4-hydroxybenzyl) isocyanurate. These can be used either alone respectively or in combinations with each other. Among these, pentaerythrityl-tetrakis[3-(3,5-di-t-butyl-4-hydroxyphenyl) propionate] is particularly preferable.

Examples of the phosphorus antioxidant include: tris(2,4-di-t-butylphenyl)phosphite, di(2,4-di-t-butylphenyl) pentaerthritol diphosphite, bis[2,4-bis(1,1-dimethylethyl)-6-methylphenyl]ethyl ester phosphite, 9,10-dihydro-9-oxa-10-phosphaphenanthrene-10-oxide, and tetrakis(2,4-di-t-butylphenyl)-4,4'-biphenylene phosphonite. These can be used either alone respectively or in combinations with each other. Among these, 9,10-dihydro-9-oxa-10-phosphaphenanthrene-10-oxide is particularly preferable.

Examples of the ultraviolet absorbing agent include: benzotriazole ultraviolet absorbing agents such as 2-(2H-benzotriazol-2-yl)-p-cresol, 2-(2H-benzotriazol-2-yl)-4,6-di-t-pentylphenol, 2-(2H-benzotriazol-2-yl)-4-(1,1,3,3-tetramethylbutyl)phenol, 2,2'-methylenebis[6-(2H-benzotriazol-2-yl)-4-( 1,1,3,3-tetramethylbutyl)phenol, and 2-(5-methyl-2 -hydroxyphenyl)benzotriazole; triazine ultraviolet absorbing agents such as 2-(4,6-diphenyl-1,3-5-triazin-2-yl)-5-[(hexyl)oxylphenol; benzophenone ultraviolet absorbing agents such as octabenzone; benzoate photo stabilizers such as 2,4-di-t-butylphenyl-3,5-di-t-butyl-4-hydroxybenzoate; hindered amine photo stabilizers such as bis(1,2,2,6,6-pentamethyl-4-piperidyl)[[3,5-bis(1,1-dimethylethyl)-4-hydroxyphenyl]methyl]butyl malonate; malonic acid ester photo stabilizers such as propanedioic acid [(4-methoxyphenyl)-methylene]dimethylether-2-ethyl, and 2'-ethoxy -oxalanilide.

The colorants may be organic colorants or inorganic colorants. Examples of the organic colorants include dyes, organic pigments, and natural pigments.

<Transparent Heat-resistant Resin>

The amount of the residual maleimide monomer in the transparent heat-resistant resin is not more than 10×ppm when the amount of a structural unit derived from the maleimide monomer is X weight % in the resin, preferably not more than 5×ppm, and the amount of the generated maleimide monomer by heating the resin at 240° C. for 10 minutes is not more than 10×ppm when the amount of a structural unit derived from the maleimide monomer is X weight % in the resin, preferably not more than 5×ppm. The amount of the generated maleimide monomer by heating the resin at 240° C. for 10 minutes is, for example, not more than 100 ppm, preferably not more than 50 ppm, more preferably not more than 30 ppm. In this way, the transparent heatresistant resin having a small amount of the residual maleimide monomer and the generated maleimide monomer by heating the resin can be obtained easily by the production process according to the present invention as mentioned above. In case where the amount of the residual maleimide monomer in the resin is more than 10×ppm or the amount of the generated maleimide monomer by heating the resin at 240° C. for 10 minutes is more than 10×ppm, much maleimide monomer from the melting resin is evaporated and dispersed when heat processing the resin as obtained, and it is dangerous that human body and environment are influenced badly. In addition, the amount of the residual maleimide monomer in the resin and the amount of the generated maleimide monomer by heating the resin are, for example, measured by a method described in the Examples mentioned below.

The transparent heat-resistant resin, according to the present invention, has a yellowness index (YI) of not more than 3.0, preferably not more than 2.5, more preferably not more than 2.0. The transparent heat-resistant resin having a low-yellowness index like this can be obtained easily by the production process according to the present invention as mentioned above. A transparent heat-resistant resin as having a yellowness index (YI) of more than 3.0, has marred transparency by the yellowness, and cannot be utilized for the objective use originally. Incidentally, the yellowness index (YI) is measured by a method described in the Example mentioned below.

The transparent heat-resistant resin, according to the present invention, preferably has a weight loss of not more than 2.0% by heating the resin from 150 to 300° C. in dynamic TG method, more preferably not more than 1.0%, most preferably not more than 0.6%. The weight loss by heating the resin in dynamic TG method is an index of the heat stability. In case where the weight loss is more than 2.0%, the heat stability is not displayed sufficiently. The resin as obtained by the production process, according to the present invention, can fulfill the above range of the weight loss by heating the resin and has the heat stability sufficiently. Incidentally, the weight loss by heating the resin in dynamic TG method is measured by a method described in the Example mentioned below.

The weight-average molecular weight of the transparent heat-resistant resin, according to the present invention, is preferably in the range of 10,000 to 300,000 , more preferably 50,000 to 250,000. In case where the weight-average molecular weight is less than 10,000, the mechanical strength of the resin becomes low. On the other hand, in case where the weight-average molecular weight is more than 300,000, it is not preferable because the molding processibility of the resin becomes low.

The glass transition temperature of the transparent heat-resistant resin, according to the present invention, is preferably in the range of 110 to 200° C., more preferably 120 to 180° C. In case where the glass transition temperature is less than 110° C., the heat resistance ia apt not to be able to be given. On the other hand, in case where the glass transition temperature is more than 200° C., it is not preferable because the mechanical strength and the molding processibility become low.

<Resin Composition>

The resin composition, according to the present invention, comprises the transparent heat-resistant resin according to the present invention, and a synthetic resin except for this transparent heat-resistant resin. The desirable property is further given to the resin composition in addition to transparency and heat resistance by further comprising the other synthetic resin having an optional property with the transparent heat-resistant resin according to the present invention.

Examples of the resin include poly(methyl methacrylate) resin, methyl methacrylate-styrene resin, styrene-acrylonitrile copolymer, ABS resin, transparent ABS resin having a group derived from methyl methacrylate monomer in the matrix portion, AES resin, ASA resin, MBS resin and vinyl chloride resin. One or not less than two kind of these resins may be blended with the above-mentioned transparent heat-resistant resin according to the present invention with such as an extruder. Incidentally, the ratio between the transparent heat-resistant resin according to the present invention and the other synthetic resin, is not especially limited, but may fitly be set according to the desirable property. Particularly, if the poly(methyl methacrylate) resin, the methyl methacrylate-styrene resin, the vinyl chloride resin, or the transparent ABS resin is used, the resin composition excellent in transparency and heat resistance can be obtained by adjusting the ratio in order to set a refractive index.

The transparent heat-resistant resin or the resin composition, according to the present invention, is excellent in heat resistance and transparency, and yellowish little. Therefore, the resin is preferably used as raw materials such as base materials of photo disc, automobile parts, lighting covers, and electric machine parts, as are materials that require not only the transparency but also a fine view.

<Resin-laminated Product>

The transparent heat-resistant resin or the resin composition, according to the present invention, can be applied to laminate products such as laminate sheets with other resin, and surface resins for bathtub. They are preferred embodiments of the transparent heat-resistant resin or the resin composition, according to the present invention. Particularly, if a laminate sheet with the poly(methyl methacrylate) resin, the methyl methacrylate-styrene resin, the vinyl chloride resin, or the transparent ABS resin as mentioned above is obtained, the laminate sheet is good adhesion and the surface thereof can be regarded as a protected layer. In addition, if the laminate sheet is recycled, a compatible uniform material can be easily prepared by kneading and molding again. The above laminating method is not especially limited, but for example, method such as coextusion molding or thermocompression can be fitly adopted.

(Effects and Advantages of the Invention)

The present invention can provide: a transparent heat-resistant resin that has a small amount of both the residual maleimide monomer and the maleimide monomer generated by heating in order to carry out such as a mold processing, and further, is excellent in heat resistance and yellowish little; a production process therefor; and a resin composition utilizing this resin.

DETAILED DESCRIPTION OF THE PREFERRED EMBODIMENTS

Hereinafter, the present invention is more specifically illustrated by the following examples of some preferred embodiments in comparison with comparative examples not according to the invention. However, the invention is not limited to the below-mentioned examples. In addition, in the examples, unless otherwise noted, the unit "part(s)" denote that by weight.

The resin as obtained is evaluated by measuring various properties by the following methods.

(Weight-average Molecular Weight)

The weight-average molecular weight of the resin was measured in terms of polystyrene by GPC (GPC system, made by TOSOH Corporation).

(Glass Transition Temperature)

The glass transition temperature of the resin was calculated by the midpoint method of DSC curve measured by using a differential scanning calorimeter (DSC-8230, made by Rigaku Denki Co., Ltd.), and α-alumina as a reference under nitrogen atmosphere at a temperature elevation rate of 10° C./minute from ordinary temperature to 200° C.

(Amount of the Residual Maleimide Monomer in the Resin)

The amount of the residual maleimide monomer in the resin was measured by use of a gas chromatography ( GC-17A, made by Shimadzu Seisakusho).

(Amount of a Structural Unit Derived From the Maleimide Monomer in the Resin (X weight %))

The amount of a structural unit derived from the maleimide monomer in the resin (X weight %) is determined from N content in this resin, which is measured by an organic elementary microanalysis instrument (Yanako CHN corder, made by Yanako Kinki).

(Amount of the Generated Maleimide Monomer by Heating)

The amount was determined according to a mass chromatography method by selecting m/z ion of maleimide in a component trapped at −40° C. and released by curie point of 30° C. according to TENAX absorption method.

Measurement device:
  Curie point purge and trap sampler
  (JHS-100A; made by Nippon Bunseki Kogyo)
  gas chromatograph mass analyzer
  (MS-ROUT, JMS-600W; made by Nippon Denshi)
Measurement conditions:
  sample amount: about 2.0 mg
  retention temperature: 240° C., 280° C.
  retention time: 10 minutes
  atmosphere (carrier gas): helium (Amounts of the Residual Maleimide Monomer, Methyl Methacrylate and the Polymer in the Polymerized Solution)

A tetrahydrofuran solution of the polymerized solution was added into methanol, and a resultant precipitate was filtrated. The amount of the polymer was determined by measuring the weight of the precipitate as obtained. The amounts of the residual maleimide monomer and methyl methacrylate respectively were determined according to a gas chromatography (GC-17A, made by Shimadzu Seisakusho).

(Yellowness Index (YI) of the Resin)

The yellowness index (YI) of the resin was measured by dissolving the resin into chloroform to prepare 15 weight % solution. And then, transmitted light of the solution was analyzed according to JIS-K-7103.

(Heat Stability: Weight Loss by Heating in Dynamic TG Method)

Analysis according to the dynamic TG method was carried out under a condition as mentioned below, and the weight loss that was lost from 150° C. to 300° C. was determined in terms of weight %.

Measurement device:
  Thermo Plus2 TG-8120 Dynamic TG (made by Rigaku Co., Ltd.)
Measurement conditions:
  sample amount: about 5 mg
  temperature elevation rate: 10° C./min
  atmosphere: nitrogen flow 200 ml/min
  method: stepwise isothermal analysis
  (controlled at weight loss rate of not higher than 0.005%/sec between 200 and 400° C.)

(Yellowness Change (YI) of the Molded Product)

The yellowness change (YI) of the molded product was determined by measuring transmitted light obtained through the molded product of 3 mm thickness according to JIS-K-7103.

(Transmission Coefficient (T) of the Entire Light of the Molded Product)

The transmission coefficient was measured by use of the molded product of 3 mm thickness according to ASTM-D-1003.

EXAMPLE 1

45 parts of methyl methacrylate, 5 parts of N-phenylmaleimide, 50 parts of toluene, 0.05 parts of dimethyl phosphite as the organic acid, and 0.20 parts of n-dodecylmercaptan as the chain-transfer agent were placed into a stainless-made polymerization vessel of 20 liters as equipped with a stirrer. After the reaction mixture was bubbled by nitrogen gas for 10 minutes with stirring at the rate of 100 rpm, the temperature elevation of the reaction mixture started under nitrogen atmosphere. When the temperature in the polymerization vessel reached 100° C., 0.15 parts of t-butyl peroxyisopropyl carbonate was added into the polymerization vessel, and then the polymerization was carried out under reflux at the polymerization temperature of 105 to 110° C. for 15 hours. Next, the polymerized solution as obtained was supplied to a vent-attached twin-screw extruder (30 mm) of which cylinder temperature was controlled at 240° C., devolatilized from a bent hole. Then, the extruded strand was pelletized, and thus obtaining pellets of the transparent heat-resistant resin.

Various properties of the pellets as obtained are described in Table 1.

EXAMPLES 2 to 7

Comparative Examples 1 to 3

Pellets of the transparent heat-resistant resins were obtained in the same way as of Example 1 except that kinds or amounts of charged components were changed as described in Tables 1 and 2.

Various properties of the pellets as obtained are described in Tables 1 and 2.

EXAMPLE 8

42.5 parts of methyl methacrylate, 5 parts of N-phenylmaleimide, 0.5 parts of styrene, 50 parts of toluene, 0.2 parts of acetic anhydride as the organic acid, and 0.06 parts of n-dodecylmercaptan as the chain-transfer agent were placed into a stainless-made polymerization vessel of 20 liters as equipped with a dropping tank and a stirrer. After the reaction mixture was bubbled by nitrogen gas for 10 minutes with stirring at the rate of 100 rpm, the temperature elevation of the reaction mixture started under nitrogen atmosphere. When the temperature in the polymerization vessel reached 100° C., 0.075 parts of t-butyl peroxyisopropyl carbonate was added into the polymerization vessel, and simultaneously, a mixed solution of 2 parts of styrene and 0.075 parts of t-butyl peroxyisopropyl carbonate was added at uniform rate over 5 hours. The mixed solution was bubbled by nitrogen gas in the dropping tank beforehand. Then, the polymerization was carried out under reflux at the polymerization temperature of 105 to 110° C. for 15 hours. Thereafter, 0.1 weight % of 9,10-dihydro-9-oxa-phosphaphenanthrene-10-oxide (HCA, made by Sanko) as the phosphorus antioxidant, 0.02 weight % of pentaerythrityl-tetrakis[3-(3,5-di-t-butyl-4-hydroxyphenyl)propionate] (AO-60, made by Asahi Denka) as the phenol antioxidant, and 0.1 weight % of 2-(5-methyl-2-hydroxyphenyl)benzotriazole (TINUVIN-P, made by Chiba Specialty Chemicals) as the ultraviolet absorbing agent were added to mix with the polymerized solution as obtained. Next, pellets of the transparent heat-resistant resin were obtained by devolatilizing with the twin-screw extruder and pelletizing as the same way of Example 1.

Various properties of the pellets as obtained are described in Table 2.

EXAMPLE 9

36.5 parts of methyl methacrylate, 11 parts of N-phenylmaleimide, 50 parts of toluene, 0.1 parts of acetic anhydride as the organic acid, and 0.02 parts of n-dodecylmercaptan as the chain-transfer agent were placed into a stainless-made polymerization vessel of 20 liters as equipped with a dropping tank and a stirrer. After the reaction mixture was bubbled by nitrogen gas for 10 minutes with stirring at the rate of 100 rpm, the temperature elevation of the reaction mixture started under nitrogen atmosphere. When the temperature in the polymerization vessel reached 100° C., 0.03 parts of t-butyl peroxyisopropyl carbonate was added into the polymerization vessel, and simultaneously, a mixed solution of 2.5 parts of styrene and 0.03 parts of t-butyl peroxyisopropyl carbonate was added at uniform rate over 5 hours. The mixed solution was bubbled by nitrogen gas in the dropping tank beforehand. Then, the polymerization was carried out under reflux at the polymerization temperature of 105 to 110° C. for 15 hours.

Next, pellets of the transparent heat-resistant resin were obtained by devolatilizing with the twin-screw extruder and pelletizing as the same way of Example 1.

Various properties of the pellets as obtained are described in Table 2.

EXAMPLE 10

An organic layer comprising 20 parts of methyl methacrylate, 3.75 parts of N-phenylmaleimide, 1.25 parts of styrene, 0.5 parts of t-butyl peroxyethylhexanoate, 0.05 parts of dimethyl phosphite, and 0.2 parts of n-dodecylmercaptan as the chain-transfer agent, wherein the organic layer was mixed and stirred beforehand; 75 parts of deionized water; and 1.5 parts of poly(sodium methacrylic acid) were placed into a reaction vessel as equipped with a reflux cooler, a nitrogen-introducing tube, a thermometer and a stirrer, and stirred at the rate of 100 rpm in order to obtain a suspension. Next, while the suspension was blown by nitrogen gas through the nitrogen-introducing tube, the reaction solution was heated at 80° C. to start the polymerization reaction. After 5 hours from starting the polymerization reaction, the temperature of the reaction solution was heated to 95° C. and continued to stir for further 2 hours to finish the polymerization. The polymerized solution as obtained was cooled, filtrated, washed with water and dried, thus obtaining beads of the transparent heat-resistant resin.

Next, 25 parts of the beads as obtained were supplied to a vent-attached twin-screw extruder (30 mm) of which cylinder temperature was controlled at 240° C. The beads were melt kneaded and pelletized, and thus obtaining pellets of the transparent heat-resistant resin.

Properties of the pellets as obtained are described in Table 2.

Comparative Example 4

Pellets of the transparent heat-resistant resin were obtained in the same way as of Example 10 except that dimethyl phosphite was not used.

Properties of the pellets as obtained are described in Table 2.

TABLE 1

| | | Example 1 | Example 2 | Example 3 | Example 4 | Example 5 | Example 6 | Example 7 |
|---|---|---|---|---|---|---|---|---|
| Entire charged components (wt %) | N-phenylmaleimide | 5 | 5 | 5 | 5 | 5 | — | 5 |
| | N-cyclohexylmaleimide | — | — | — | — | — | 5 | — |
| | Methyl methacrylate | 45 | 45 | 45 | 45 | 45 | 45 | 45 |
| | Styrene | — | — | — | — | — | — | — |
| | Toluene | 50 | 50 | 50 | 50 | 50 | 50 | 50 |
| Chain-transfer agent (wt %)*1 | n-Dodecyl mercaptan | 0.20 | 0.20 | 0.20 | 0.20 | — | 0.20 | 0.20 |
| | t-Dodecyl mercaptan | — | — | — | — | 0.20 | — | — |
| Acidic substance (wt %)*1 | Dimethyl phosphite | 0.05 | — | — | — | 0.05 | 0.05 | — |
| | Diethylhexyl phosphate | — | — | — | 0.005 | — | — | — |
| | Phenylphosphonic acid | — | — | — | — | — | — | 0.005 |
| | Acetic acid | — | 0.03 | — | — | — | — | — |
| | Acetic anhydride | — | — | 0.02 | — | — | — | — |
| | Reaction method *2 | SO | SO | SO | SO | SO | SO | SO |
| Properties of polymerized solution | Residual maleimide monomer (wt %) | 0.006 | 0.006 | 0.006 | 0.006 | 0.005 | 0.025 | 0.006 |
| | Residual methyl methacrylate (wt %) | 2.0 | 2.2 | 2.5 | 1.8 | 1.7 | 2.2 | 1.9 |
| | Polymer amount (wt %) | 48.0 | 48.0 | 48.0 | 48.0 | 48.0 | 47.5 | 48.0 |
| | X *3 (wt %) | 9.8 | 10.1 | 10.0 | 9.7 | 9.7 | 10.0 | 9.8 |
| | 10 X | 98 | 101 | 100 | 97 | 97 | 100 | 98 |
| Properties of resin | Residual maleimide monomer (ppm) | 25 | 35 | 30 | 43 | 20 | 85 | 36 |
| | Residual methyl methacrylate (ppm) | 400 | 410 | 420 | 380 | 450 | 560 | 400 |
| | Weight average molecular weight | $11 \times 10^4$ | $13 \times 10^4$ | $36 \times 10^4$ | $12 \times 10^4$ | $13 \times 10^4$ | $11 \times 10^4$ | $11 \times 10^4$ |
| | Yellowness index (YI) | 1.5 | 2.0 | 1.0 | 2.1 | 1.9 | 1.5 | 2.2 |
| | Weight loss by heating in dynamic TG method (%) | 0.2 | 0.2 | 0.2 | 0.2 | 0.2 | 0.5 | 0.3 |
| | *4   240° C. | 15 | 12 | 10 | 24 | 16 | 55 | 35 |
| | 280° C. | 42 | 39 | 35 | 55 | 45 | 145 | 58 |

*1: Weight % of the entire charged components,
*2: Solution polymerization (SO),
*3: Amount of a structural unit derived from the maleimide monomer
*4: Amount of the generated maleimide monomer by heating (ppm).

TABLE 2

|  |  | Example 8 *5 | Example 9 | Example 10 | Comparative Example 1 | Comparative Example 2 | Comparative Example 3 | Comparative Example 4 |
|---|---|---|---|---|---|---|---|---|
| Entire charged components (wt %) | N-phenylmaleimide | 5 | 11 | — | 5 | 5 | — | — |
|  | N-cyclohexylmaleimide | — | — | 3.75 | — | — | 7.5 | 3.75 |
|  | Methyl methacrylate | 42.5 | 36.5 | 20 | 45 | 45 | 40 | 20 |
|  | Styrene | 2.5 | 2.5 | 1.25 | — | — | 2.5 | 1.25 |
|  | Toluene | 50 | 50 | — | 50 | 50 | 50 | — |
|  | Deionized water | — | — | 75 | — | — | — | 75 |
| Chain-transfer agent (wt %)*1 | n-Dodecyl mercaptan | 0.06 | 0.02 | 0.20 | 0.20 | — | 0.20 | 0.20 |
|  | t-Dodecyl mercaptan | — | — | — | — | 0.20 | — | — |
| Acidic substance (wt %)*1 | Dimethyl phosphite | — | — | 0.05 | — | — | — | — |
|  | Acetic anhydride | 0.20 | 0.1 | — | — | — | — | — |
| Properties of polymerized solution | Reaction method *2 | SOD | SOD | SU | SO | SO | SO | SU |
|  | Residual maleimide monomer (wt %) | 0.001 | 0.060 | 0.050 | 0.032 | 0.025 | 0.040 | 0.060 |
|  | Residual methyl methacrytate (wt %) | 3.5 | 1.5 | 1.0 | 3.5 | 2.9 | 4.3 | 2.5 |
|  | Polymer amount (wt %) | 46.3 | 48.0 | 49.0 | 46.5 | 47.0 | 45.8 | 47.4 |
|  | X *3 (wt %) | 10.0 | 22.0 | 15.1 | 9.8 | 10.1 | 15.0 | 15.1 |
|  | 10 X | 100 | 220 | 151 | 98 | 101 | 150 | 151 |
| Properties of resin | Residual maleimide monomer (ppm) | 10 | 80 | 90 | 160 | 143 | 210 | 250 |
|  | Residual methyl methacrylate (ppm) | 800 | 1500 | 650 | 700 | 600 | 620 | 550 |
|  | Weight-average molecular weight | $16 \times 10^4$ | $24 \times 10^4$ | $13 \times 10^4$ | $9 \times 10^4$ | $11 \times 10^4$ | $14 \times 10^4$ | $13 \times 10^4$ |
|  | Yellowness index (YI) | 0.6 | 2.5 | 2.9 | 5.6 | 6.7 | 1.5 | 1.8 |
|  | Weight loss by heating in dynamic TG method (%) | 0.2 | 0.3 | 0.8 | 0.1 | 0.2 | 0.2 | 0.7 |
| *4 | 240° C. | 8 | 90 | 90 | 120 | 110 | 123 | 156 |
|  | 280° C. | 15 | 182 | 180 | 205 | 190 | 315 | 325 |

*1: Weight % of the entire charged components,
*2: Solution dropping polymerization (SOD), Solution polymerization (SO), Suspension polymerization (SU)
*3: Amount of a structural unit derived from the maleimide monomer,
*4: Amount of the generated maleimide monomer by heating (ppm),
*5: Further comprising stasbilizers (phosphorus antioxidant 0.1 wt %, phenol antioxidant 0.02 wt %, and ultraviolet absorbing agent 0.1 wt %) in Example 8.

Referential Example 1

A test piece was prepared by molding the transparent heat-resistant resin as obtained in Example 7. Then, the following weather resistance test was carried out. Namely, when sunshine carbon arc lump was irradiated at 60° C., variations per time passage of the yellowness change (YI) and the transmission coefficient of the entire light of the test piece placed on the panel. Incidentally, the variation of the yellowness change is represented by the difference (ΔYI) from the initial value. Results thereof are described in Table 3.

TABLE 3

| Irradiation time (hr) | 600 | 1000 | 2000 |
|---|---|---|---|
| Yellowness change (ΔYI) | −0.5 | −0.8 | −1.0 |
| Transmission coefficient of the entire light | 92.1 | 92.0 | 92.1 |

From Table 3, it is clear that the molded product of the transparent heat-resistant resin according to the present invention is excellent in weather resistance, and color and transparency thereof are not caused to lower even if the carbon arc lump is irradiated.

Referential Example 2

The transparent heat-resistant resin as obtained in Example 1 was molded to form a film of 100 μm thickness. This film and commercially available methacrylate sheet (Sumipex EX, made by Sumitomo Kagaku) of 2.00 mm thickness were stuck by a heated roll at 180° C., and thus obtaining a laminate product.

The laminate product as obtained was cut into pieces (5 cm×5 cm). The surface, on which the transparent heat-resistant resin as obtained in Example 1 was laminated, was soaked in hot water of 90° C. for 100 hours in order to carry out hot water resistance test. Then, change of color and deformation were not observed in appearance. On the other hand, the surface, on which the transparent heat-resistant resin as obtained in Example 1 was laminated, was soaked in methanol for 7 days in order to carry out methanol resistance test. Then, change of color and deformation were not observed in appearance.

In addition, the transmission coefficient of the entire light of the obtained laminate product according to ASTM-D-1003 was 92%.

Referential Example 3

The transparent heat-resistant resin as obtained in Example 1 and poly(methyl methacrylate) resin (Sumipex EX, made by Sumitomo Kagaku) were coextruded from an extuder, and a laminate sheet of 5 mm thickness and 500 mm width was obtained by cooling a roll of the extuder at 60° C. rapidly. In the above coextusion molding, the thickness ratio of the transparent heat-resistant resin layer/poly(methyl methacrylate) resin layer was adjusted to 5/95.

The laminate sheet as obtained was cut into pieces (5 cm×5 cm). The surface, on which the transparent heat-resistant resin as obtained in Example 1 was laminated, was soaked in hot water of 90° C. for 100 hours in order to carry out hot water resistance test. Then, change of color and deformation were not observed in appearance. On the other hand, the surface, on which the transparent heat-resistant resin as obtained in Example 1 was laminated, was soaked in methanol for 7 days in order to carry out methanol resistance test. Then, change of color and deformation were not observed in appearance. On the other hand, the surface, on which the transparent heat-resistant resin as obtained in Example 1 was laminated, was soaked in methanol for 7 days in order to carry out methanol resistance test. Then, change of color and deformation were not observed in appearance.

In addition, the transmission coefficient of the entire light of the obtained laminate sheet according to ASTM-D-1003 was 92%.

Various details of the invention may be changed without departing from its spirit not its scope. Furthermore, the foregoing description of the preferred embodiments according to the present invention is provided for the purpose of illustration only, and not for the purpose of limiting the invention as defined by the appended claims and their equivalents.

What is claimed is:

1. A transparent heat-resistant resin, which is obtained by a process including the step of running a polymerization of comonomers including a maleimide monomer and a methacrylic acid ester monomer, with the transparent heat-resistant resin being characterized in that: the amount of the residual maleimide monomer in the resin is not more than 10× ppm when the amount of a structural unit derived from the maleimide monomer is X weight % in the resin, and the amount of the generated maleimide monomer by heating the resin at 240° C. for 10 minutes is not more than 10× ppm when the amount of a structural unit derived from the maleimide monomer is X weight % in the resin.

2. A transparent heat-resistant resin according to claim 1, wherein the resin has a yellowness index (YI) of not more than 3.0.

3. A transparent heat-resistant resin according to claim 1, wherein the resin has a weight loss of not more than 2.0% by heating the resin from 150 to 300° C. in dynamic TG method.

4. A transparent heat-resistant resin according to claim 2, wherein the resin has a weight loss of not more than 2.0% by heating the resin from 150 to 300° C. in dynamic TG method.

5. A production process for a transparent heat-resistant resin, comprising the step of running a polymerization of comonomers including a maleimide monomer and a methacrylic acid ester monomer in order to obtain a transparent resin having heat resistance, with the production process being characterized by making an acidic substance exist with a sulfur chain-transfer agent in the polymerization system during the polymerization.

6. A production process for a transparent heat-resistant resin according to claim 5, wherein an organophosphorus compound is used as the acidic substance.

7. A production process according to claim 6, wherein the organophosphorus compound is one or more of members selected from the group consisting of: alkyl(aryl) phosphorous acids and their diesters or monoesters; alkyl (aryl)phosphinic acids and their esters; alkyl(aryl) phosphonic acids and their diesters or monoesters; alkyl (aryl)phosphinous acids and their esters; alkyl(aryl) phosphorous acid diesters, monoesters or triesters; and alkyl (aryl)phosphoric acid diesters, monoesters or triesters.

8. A production process according to claim 5, wherein an organic acid is used as the acidic substance.

9. A production process according to claim 5, wherein the polymerization is carried out in a nonaqueous system.

10. A production process according to claim 6, wherein the polymerization is carried out in a nonaqueous system.

11. A production process according to claim 7, wherein the polymerization is carried out in a nonaqueous system.

12. A production process according to claim 8, wherein the polymerization is carried out in a nonaqueous system.

13. A resin composition, comprising the transparent heat-resistant resin as recited in claim 1, and a synthetic resin except for the transparent heat-resistant resin.

14. A resin composition, comprising the transparent heat-resistant resin as recited in claim 2, and a synthetic resin except for the transparent heat-resistant resin.

15. A resin composition, comprising the transparent heat-resistant resin as recited in claim 3, and a synthetic resin except for the transparent heat-resistant resin.

16. A resin composition, comprising the transparent heat-resistant resin as recited in claim 4, and a synthetic resin except for the transparent heat-resistant resin.

* * * * *